C. HEDDON.
FISH BAIT OR LURE.
APPLICATION FILED SEPT. 14, 1914.

1,182,010.

Patented May 9, 1916.

Witnesses:
Robert H. Weir
Margaret Shielen

Inventor
Charles Heddon
Jones, Addington, Ames & Seibold
Attys.

UNITED STATES PATENT OFFICE.

CHARLES HEDDON, OF DOWAGIAC, MICHIGAN.

FISH BAIT OR LURE.

1,182,010. Specification of Letters Patent. Patented May 9, 1916.

Application filed September 14, 1914. Serial No. 861,495.

*To all whom it may concern:*

Be it known that I, CHARLES HEDDON, a citizen of the United States, residing at Dowagiac, in the county of Cass and State of Michigan, have invented new and useful Improvements in Fish Baits or Lures, of which the following is a full, clear, concise, and exact description, reference being had to the accompanying drawing, forming a part of this specification.

My invention relates to improvements in fish baits or lures, my object being to provide an improved bait or lure the running depth of which in the water can be readily varied, regulated and controlled by the user.

In carrying out my invention I provide the bait with one or more fins, the surface area of which is adapted to be expanded or contracted to vary the extent of area or fin surface that is presented to the water. The fin or fins thus cause the bait to dive under the water and to run at a greater or less depth according to the extent of fin surface presented to the action of the water.

For the purpose of disclosing my invention I have illustrated in the accompanying drawings one embodiment thereof.

Figure 1:
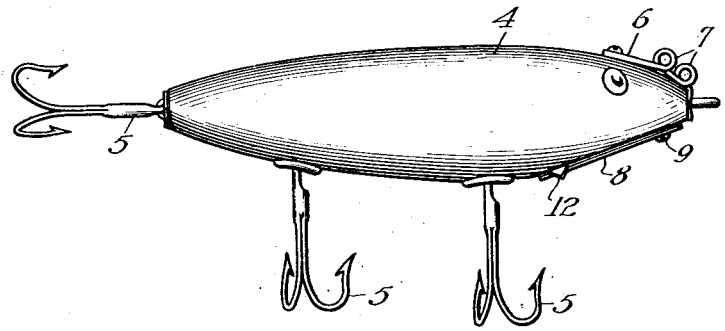
Figure 2:
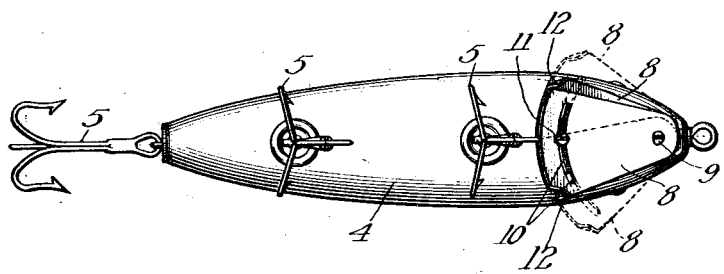

In these drawings—Figure 1 is a side elevation of an artificial minnow provided with my improved depth regulating device; Fig. 2 is a bottom view; and Fig. 3 is an end view of the device shown in Fig. 1.

Referring to the embodiment illustrated, the artificial minnow comprises a fish-shaped body 4, which is preferably formed of wood and ornamented in any desired manner. The body 4 has secured thereto, in any suitable manner and location, a number of hooks 5. A member 6, secured to the head end of the minnow, has a number of eyes 7, in any one of which the fish line may be fastened. A pair of fin members 8, which may be of sheet metal or other desired material, are pivotally secured on the under side of the minnow near the head end thereof by means of a pivot member, such as the screw 9. Each fin member 8 has an arcuate slot 10 therein, through both of which passes a screw 11, which may be screwed into the body 4 to hold the fins in different positions. A lug 12 is struck up from each fin member to aid in positioning it about the pivot 9.

Figure 3:
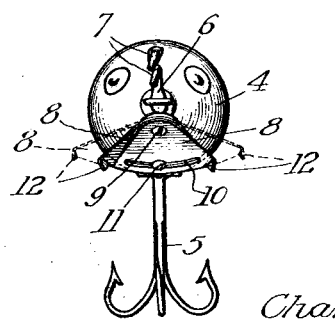

In the use of my device the depth at which the bait shall run in the water is regulated by moving the fin members 8 out or in, about the pivot 9, as indicated in dotted lines in Figs. 2 and 3, to present a greater or lesser fin surface to the water, as it is drawn therethrough, the bait running deeper or shallower as a greater or lesser fin surface is presented. The bait, which floats when at rest on the water, is caused to dive and run at the depth to which the fins are regulated. The fin members are preferably so held in place that while they can readily be expanded or contracted by the fingers of the hand, they will remain in the position to which they are set until manually changed.

It is apparent that various changes, alterations and substitutions may be made in my invention as set forth herein and in the appended claims, without departing from the scope or principle of the same.

Having thus described my invention, what I claim as new and desire to secure by Letters Patent is:—

1. In an artificial bait, the combination of a body, a hook secured thereto, means whereby a fish line may be secured to said body whereby it may be drawn through the water, and a device regulating the depth at which said body will move, having means whereby it may be adjusted to present different areas of surface to the water.

2. In an artificial bait, the combination of a body, a hook secured thereto, means whereby a fish line may be secured to said body whereby it may be drawn through the water, and a fin device for regulating the depth at which said body will move, having means whereby it may be adjusted to present different areas of fin surface to the water.

3. In an artificial bait, the combination of a body, a hook secured thereto and a device for regulating the manner in which said body will travel through the water, having means whereby it may be adjusted to present different areas of surface to the water.

4. In an artificial bait, the combination of a body, a hook secured thereto, and a fin device for regulating the manner in which said body will travel through the water, having means whereby it may be adjusted to present different areas of fin surface to the water.

5. An artificial bait comprising an elongated body, means for attaching a line at one end thereof, a plate movably mounted on said body near said end having its surface engaging a surface of said body and movable therealong, said plate having an edge movable to extend a greater or less distance from said body.

6. An artificial bait comprising an elongated body, means for attaching a line at one end thereof, a plate movably mounted on said body near said end having its surface engaging a surface of said body and movable therealong, said plate having an edge movable to extend a greater or less distance from said body, said plate being inclined to the axis of said elongated body.

7. In an artificial bait, the combination of a body, a hook secured thereto, and means for regulating the manner in which said body will travel in the water comprising a pair of overlapping movable fin members mounted thereon.

8. In an artificial bait, the combination of a body, a hook secured thereto, and means for regulating the manner in which said body will travel in the water comprising a pair of overlapping movable fin members mounted on a common pivot.

9. In an artificial bait, the combination of a body, a hook secured thereto, a pair of overlapping movable fin members mounted thereon, and means for holding said members in different adjusted positions.

10. In an artificial bait, the combination of a body, a hook secured thereto, a pair of overlapping movable slotted fin members mounted thereon, and a screw passing through said slots and into said body for holding said members in adjusted position.

11. An artificial bait comprising an elongated body, means for attaching a line at one end thereof, a plate movably engaging a surface of said body and movable therealong, said plate having an edge movable to extend a greater or less distance from said body, and having a lug struck up therefrom to aid in adjusting the plate.

12. A fish bait or lure comprising means for regulating the manner in which said bait will travel in the water including a fin of suitable material arranged to be expanded or contracted to present varying areas of fin surface to the water.

13. A fish bait or lure comprising means for regulating the manner in which said bait will travel in the water including a fin comprising overlapping fan-like fin members arranged to be expanded or contracted to present varying areas of fin surface to the water.

In witness whereof, I have hereunto subscribed my name in the presence of two witnesses.

CHARLES HEDDON.

Witnesses:
  W. A. STALLEY,
  MABEL ANDREWS.